US006804517B1

(12) United States Patent
Laurila

(10) Patent No.: US 6,804,517 B1
(45) Date of Patent: Oct. 12, 2004

(54) METHOD AND ARRANGEMENT FOR CONTROLLING A MOBILE SUBSCRIPTION IN A MODULE COMMUNICATION SYSTEM

(75) Inventor: Pasi Laurila, Tupos (FI)

(73) Assignee: Nokia Mobile Phones Ltd., Espoo (FI)

( * ) Notice: Subject to any disclaimer, the term of this patent is extended or adjusted under 35 U.S.C. 154(b) by 301 days.

(21) Appl. No.: 09/655,923

(22) Filed: Sep. 6, 2000

(30) Foreign Application Priority Data

Sep. 9, 1999 (FI) .............................................. 19991918

(51) Int. Cl.[7] .............................................. H04Q 7/20
(52) U.S. Cl. ............................... 455/435.1; 455/432.1; 455/410; 455/411; 455/407
(58) Field of Search ................... 455/410, 411, 455/466, 406, 405, 407, 408, 432.3

(56) References Cited

U.S. PATENT DOCUMENTS

| | | | | |
|---|---|---|---|---|
| 5,237,612 A | * | 8/1993 | Raith ......................... | 455/411 |
| 5,303,285 A | * | 4/1994 | Kerihuel et al. ............ | 455/411 |
| 5,412,726 A | | 5/1995 | Nevoux et al. .............. | 380/24 |
| 5,537,474 A | * | 7/1996 | Brown et al. ................ | 455/411 |
| 5,577,100 A | * | 11/1996 | McGregor et al. .......... | 455/406 |
| 5,729,537 A | * | 3/1998 | Billstrom ..................... | 455/411 |
| 5,748,720 A | * | 5/1998 | Loder .......................... | 455/406 |
| 6,070,067 A | * | 5/2000 | Nguyen et al. .............. | 455/407 |
| 6,198,823 B1 | * | 3/2001 | Mills ........................... | 455/411 |
| 6,311,054 B1 | * | 10/2001 | Korpela ....................... | 455/406 |
| 6,393,269 B1 | * | 5/2002 | Hartmaier et al. .......... | 455/406 |
| 6,415,142 B1 | * | 7/2002 | Martineau ................... | 455/411 |

FOREIGN PATENT DOCUMENTS

| | | |
|---|---|---|
| GB | 2265522 A | 9/1993 |
| WO | WO 95/28062 | 10/1995 |
| WO | WO 97/40616 | 10/1997 |
| WO | WO 98/28903 | 7/1998 |
| WO | WO 99/04548 | 1/1999 |
| WO | WO 99/23810 | 5/1999 |

OTHER PUBLICATIONS

"Payphone Service for Third Generation Mobile Systems", Krayem–Nevoux et al., Global Telecommunications Conference, IEEE, 1993, pp. 1708–1712.

* cited by examiner

*Primary Examiner*—Edward F. Urban
*Assistant Examiner*—Lana Le
(74) *Attorney, Agent, or Firm*—Perman & Green, LLP

(57) ABSTRACT

The invention relates to a method and arrangement for controlling a mobile subscription in a mobile communication system. The invention finds particular utility in arranging prepaid calls and in monitoring a quantitative right of use in a digital mobile communication system. An idea of the invention is to include the information about the accumulated or remaining right of use (ACM) in a response message (SRES') transmitted to the network in connection with the authentication (210). Inclusion in the message can be realized using a predetermined algorithm (208). This way the network is able to check, using the corresponding algorithm, that the charge information stored in the SIM module of the mobile station is correct (214, 218). In addition, the algorithm stored in the SIM module can be altered by the operator using an SMS (Short Message Service) message system associated with SIM modules.

11 Claims, 4 Drawing Sheets

METHOD AND ARRANGEMENT FOR CONTROLLING A MOBILE SUBSCRIPTION IN A MODULE COMMUNICATION SYSTEM

The invention relates to a method and arrangement for controlling a subscription in a mobile communication system. The invention finds particular utility in arranging prepaid calls and in monitoring a quantitative right of use in a digital mobile communication system.

The Subscriber Identity Module (SIM) card is an intelligent card used in digital mobile stations that stores, among other things, the subscriber's identification information such as e.g. the mobile phone number. The system routes calls for the subscriber to that mobile station which has the subscriber's SIM card installed in it. The subscriber may change mobile stations simply by removing the SIM card from one apparatus and inserting it in another one. In addition to said identification information the SIM card may store SMS (Short Message Service) messages, the subscriber's private phone book as well as other information chosen by the subscriber. In addition, the GSM (Global System for Mobile Communications), for example, may store various control data in the SIM card. The SIM card and the architecture of the GSM are described in more detail e.g. in a book by Michel Mouly & Marie-Bernadette Pautet: The GSM System for Mobile Communications, ISBN 2-9507190-0-7, Palaiseau 1992. The SIM card is described in detail in the GSM Recommendation ETSI GSM 11.11 and in the standard ISO/IEC 7816.

When a person subscribes to a service provided by a mobile network operator, he or she is given a SIM card that identifies the subscription. Usually the operator charges the subscriber for the calls he or she has made using e.g. invoices sent to the subscriber regularly. Often, however, a person needs a mobile station for only a short period of time, e.g. in connection with a trip abroad, so it would be inconvenient to have a permanent subscription in that case. In many cases it would be too risky for the operator to allow credit to the subscriber, whereby payments in arrear cannot be allowed. For this reason there are mobile subscriptions in which a certain call charge is paid in advance, and if the prepaid sum is exhausted the mobile subscription will be closed. Such subscriptions are hereinafter called prepaid subscriptions.

In the current GSM system a prepaid subscription is realized such that information indicating the sum of prepaid call charges is stored in the SIM card. Use of a prepaid SIM card requires that messages be transferred between the SIM card and system so that the system can make sure the prepaid sum is not exceeded.

Figure 1:
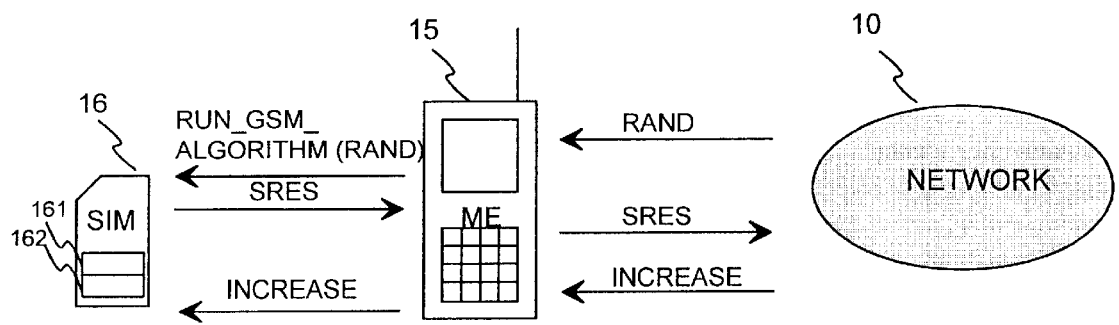

FIG. 1 shows signaling in relation to controlling the right of use of a subscription in a GSM system. A mobile station ME, as it becomes connected to a mobile network 10, is first authenticated. In the authentication, the network transmits to the mobile station 15 a random RAND number on the basis of which the SIM card 16 in the mobile station computes a so-called SRES number which is then transmitted back to the network. The SRES number is computed using the subscription identification information stored in the SIM card, so the network can verify the authenticity of the subscription by comparing the SRES number obtained from the mobile station with that computed in the network.

The SIM card 16 includes a so-called accumulated calling meter (ACM) register 161 such that the value in the register represents the cost accumulated from calls made on the mobile station. During a call the mobile station sends to the SIM card so-called INCREASE messages which, when received, increase the value in the ACM register stored in the SIM card. The value in the ACM register is increased according to the charge parameters transmitted by the network to the mobile station in the SETUP message in connection with call establishment. The charge parameters include e.g. the frequency at which the mobile station has to send INCREASE commands to the SIM card, and the amount with which the value in the ACM register has to be increased by each INCREASE command. Advice of Charge message is used to transmit the advance payment information of the call. In addition, a so-called $ACM_{MAX}$ value 162 is stored in the SIM card, which must not be exceeded by the value in the ACM register. As the value in the ACM register reaches the $ACM_{MAX}$ value, new calls cannot be made any more. When the user subsequently buys more call time for the SIM, the ACM register is reset and a possible new $ACM_{MAX}$ value is set.

The problem with the method described above is that the interface between the SIM card and mobile station is not protected, so the user may prevent the transmission of INCREASE commands to the SIM module. In that case the value in the ACM register will not be incremented and the user is able to place a limitless number of calls without paying for them.

A known solution to this problem is such that the ACM and $ACM_{MAX}$ register values are kept in the network instead of the SIM card. An advantage of this solution is its reliability and the fact that no registers are needed in the SIM card for the monitoring of the use of the mobile subscription. However, the problem with this solution is that during a call the network has to update the value in the ACM register continuously, which puts a considerable load on the network's processing capacity.

In a second known solution the ACM registers are kept in the SIM card and the network transmits to the SIM card at predetermined moments of time an SMS (Short Message Service) message which contains an instruction to the SIM card to transmit the ACM register to the network. The SIM card interprets the instruction, reads the value in the ACM register, and sends to the network a response message containing the value of the ACM register. The network then compares the received ACM value with the previous received ACM value. If the ACM value has not changed even though calls have been placed from a mobile station using the subscriber's SIM card, it is evident that the user has manipulated the interface between the SIM card and mobile station. In that case the network may terminate the subscription. An advantage of this solution is that the network need not update the ACM register during calls. A disadvantage of the solution is, however, that additional SMS signaling is needed for checking the ACM register.

The object of the invention is to provide a solution with which the use of a prepaid subscription can be controlled reliably without causing considerable need for signaling between the mobile station and network.

An idea of the invention is to include the information about the value of the parameter representing the amount of right of use in a response message sent to the network in connection with the authentication of the mobile station. Inclusion in the message can be realized using a predetermined algorithm. This way the network is able to check, using the corresponding algorithm, that the charge information stored in the SIM module is correct. Moreover, the algorithm stored in the SIM module can be altered by the operator e.g. by using the SMS message system associated with SIM modules.

The present invention is based on the use of an instruction, such as e.g. RUN GSM ALGORITHM, applied advantageously in the authentication of the subscription. The RUN GSM ALGORITHM instruction is sent to the SIM module in order to enable the use of the network. Furthermore, the response message SRES+Kc to the instruction has to be correct. If the user prevents the instruction from being transmitted to the mobile station the network will not receive a response from the mobile station in a predetermined time, in which case the use of the mobile station can be prevented.

An additional advantage of the invention is that no real-time mobile subscription monitoring is needed in the system's switching equipment, so signaling and processing capacity in the system are saved for other needs.

A method according to the invention for controlling the right of use of a mobile subscription in a mobile communication system, in which the mobile subscription is authenticated by means of authentication signaling between a mobile station and the mobile communication system, is characterized in that information representing the spent and/or remaining amount of right of use is transmitted to the mobile communications system in connection with said authentication signaling.

A mobile communication system according to the invention, which comprises means for controlling the quantitative right of use of a mobile subscription and means for authenticating a mobile subscription by means of authentication signaling between a mobile station and the mobile communication system, is characterized in that the system also comprises means for transmitting information representing the spent and/or remaining amount of the right of use to the mobile communication system in connection with said authentication signaling.

A SIM card according to the invention, intended to be connected to a mobile station, comprising means for processing mobile subscription authentication signals and for generating an authentication message to be transferred to the mobile station and mobile communication system, is characterized in that it comprises means for including information representing the spent and/or remaining amount of the right of use of a mobile subscription in said authentication message.

A mobile station according to the invention is characterized in that it comprises a SIM card according to the invention.

The invention also pertains to a mobile station, which comprises means for connecting a SIM card to the mobile station and means for becoming connected to a mobile communication system, and means for exchanging mobile subscription authentication signals between the SIM card and mobile communication system, characterized in that the mobile station comprises means for transferring information representing the spent and/or remaining amount of a right of use from the SIM card to the mobile communication system in connection with said authentication signaling.

Preferred embodiments of the invention are presented in the dependent claims.

It should be noted that in this application the monitored amount relating to the charge or use of the mobile subscription can mean either the accumulated charge/use or the remaining charge/use. In this application, a SIM card refers generally to intelligent modules to identify a telephone subscription, thereby not being limited to any mechanical design used for the packing of the chips performing the functions, for example, nor limiting how the connections with the mobile station are realized.

Figure 5:
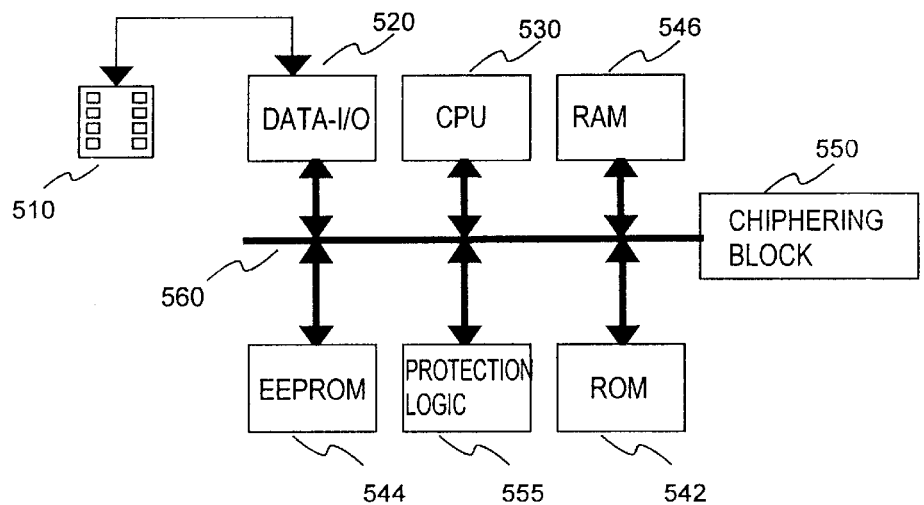
Figure 2:
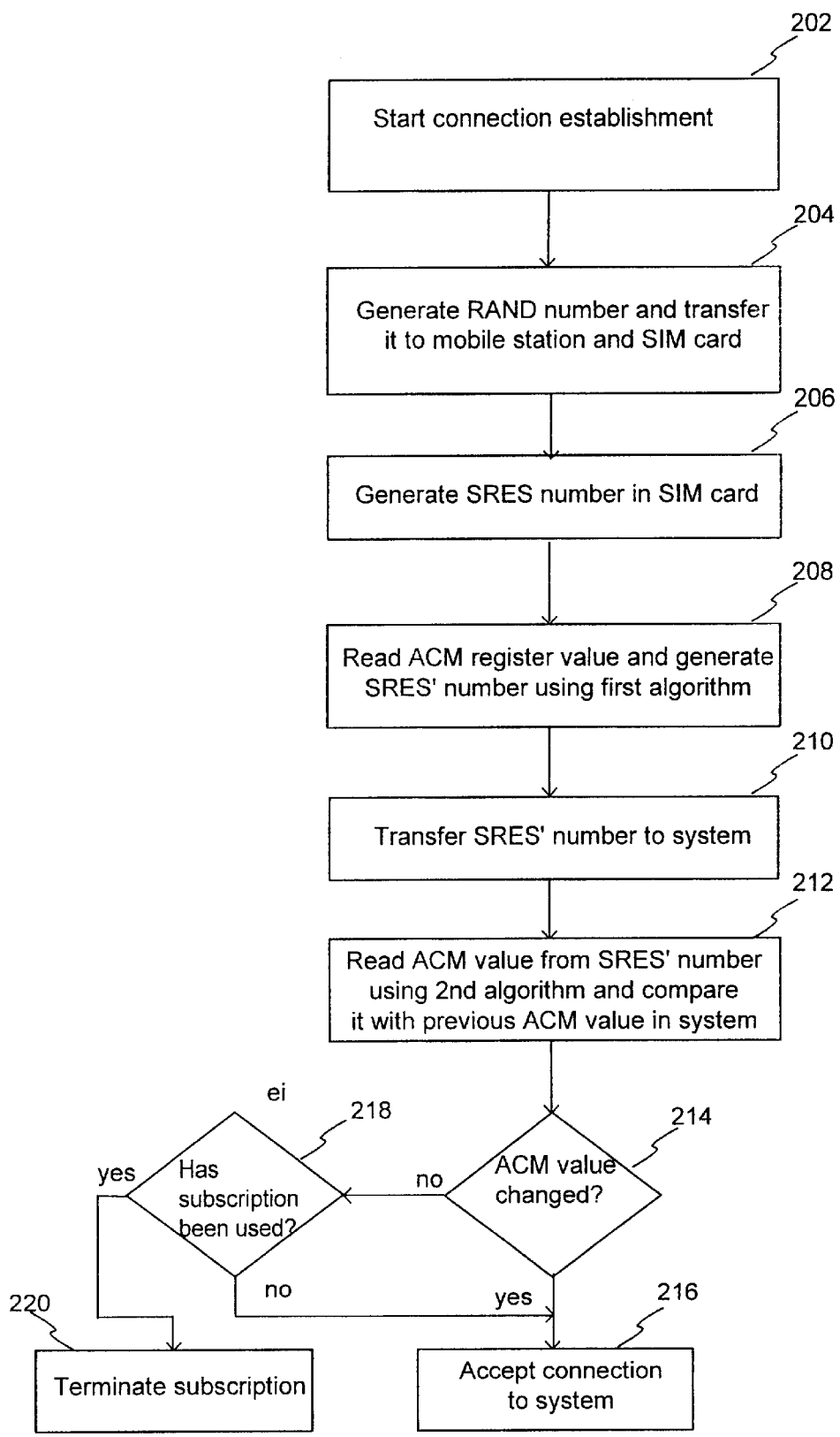
Figure 3:
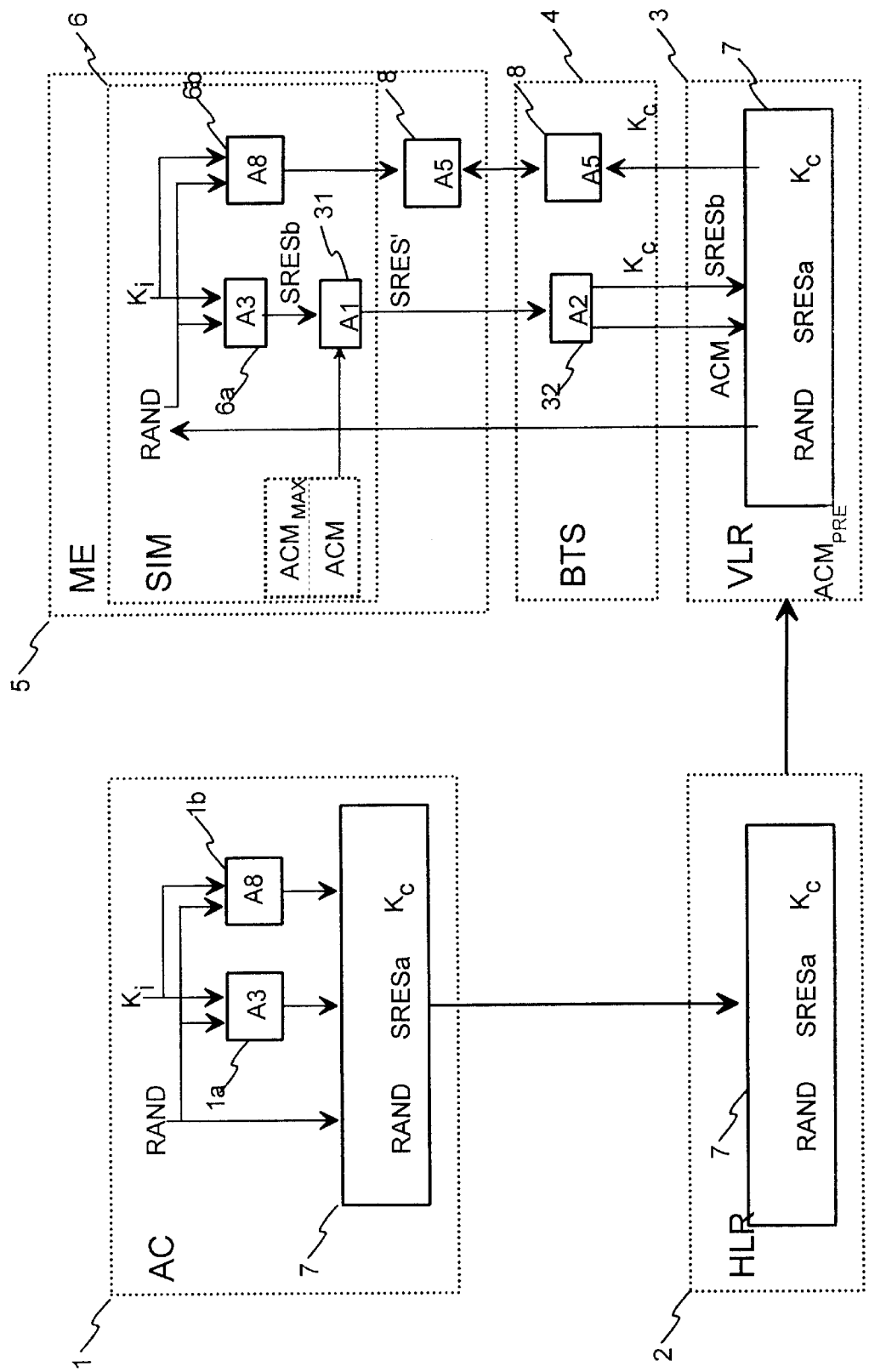
Figure 4:
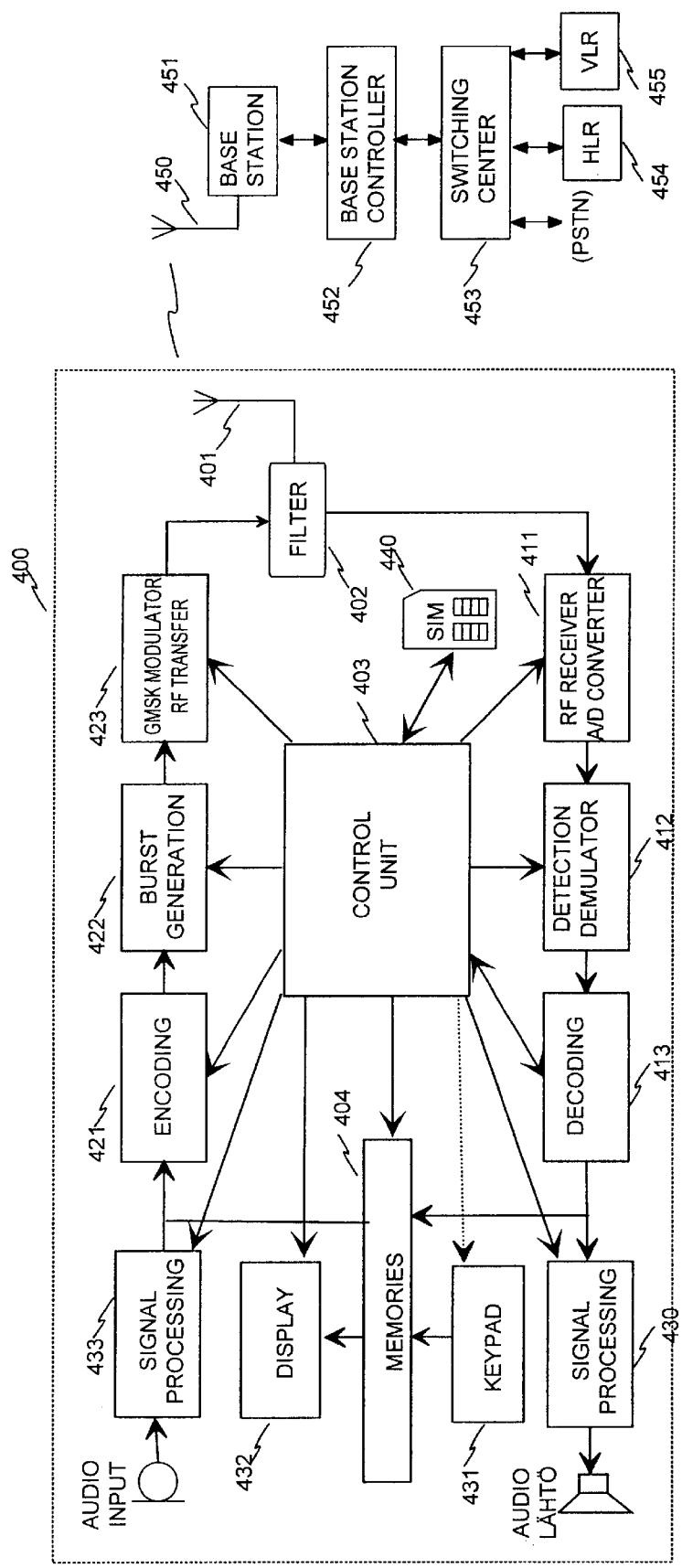

The invention will now be described in more detail with reference to the accompanying drawings wherein FIG. 1 shows an arrangement according to the prior art for controlling a prepaid subscription, FIG. 2 shows a flow diagram of a method according to the invention, FIG. 3 shows a signaling diagram of a solution according to the invention in a GSM system, FIG. 4 shows a mobile station according to the invention and its connection with a mobile communication system, and FIG. 5 shows a SIM card according to the invention.

FIG. 1 was already discussed in connection with the description of the prior art.

FIG. 2 shows a flow diagram of a method according to the invention for controlling the use of a prepaid mobile subscription in a GSM system. Mobile subscription authentication is begun when connection establishment between the mobile station and base station is started, phase 202. The system generates a random RAND number which is transferred to the mobile station, phase 204. The mobile station sends to the SIM card connected to it an instruction RUN GSM ALGORITHM, which includes the RAND number obtained from the system. The RAND number and an authentication key (Ki) are used to generate a SRES number, phase 206.

The ACM register value stored in the SIM card is then read, and an SRES' number is generated using a first algorithm A1, phase 208. The SRES' number generated is further transferred to the system, phase 210. The SRES' number received by the system is used to generate an SRES number and ACM value by means of a second algorithm A2, phase 212, and the ACM value read is compared to the ACM value stored earlier in the system. If the ACM value has changed in accordance with the calls made, 214, connection of the mobile station to the system is accepted, 216. If the ACM value has not changed even though the mobile subscription has been used, 218, it may be interpreted to mean that the user has prevented the increase of the ACM register value and the mobile subscription may be terminated, 220.

FIG. 3 shows a signaling arrangement according to the invention applied in a GSM system. Below it is first described in more detail the authentication procedure in the GSM system and then the mobile subscription control according to the invention.

The system depicted in FIG. 3 comprises an authentication center AC 1, Home Location Register HLR 2, Visitor Location Register VLR 3, Base Transceiver Station BTS 4, and mobile station ME 5 including a SIM card 6.

Authentication and chiphering in mobile communications systems are usually based on symmetric or public key schemes. In the GSM system, authentication and chiphering are based on the use of a symmetric key. A common authentication key $K_i$ is stored in a SIM card connected to a mobile station ME and in an authentication center AC. The mobile station is authenticated using chiphering algorithm A by means of which a connection-specific chiphering key $K_c$ is derived from the common chiphering key in both the mobile station and authentication center.

Mobile station authentication is carried out as follows: An authentication center AC 1 generates a random number RAND which is included as such in an authentication triplet 7. The authentication triplet 7 additionally includes a signed response (SRES) number, generated from the subscriber-specific key $K_i$ using algorithm A3, and an chiphering key Kca which is generated from the random number RAND using algorithm A8. The authentication triplet is transmitted to the home location register HLR 2 and further to a visitor location register VLR 3 if the mobile station is located in its area. The random number RAND is further transmitted to the SIM card 6 in the mobile station ME 5.

Using algorithm A3 the SIM card generates, on the basis of the RAND number and subscriber-specific authentication key $K_i$, an equivalent SRESb of the SRESa number in the triplet 7 of the visitor location register 3. This takes place initiated by a RUN GSM ALGORITHM (RAND) issued by the mobile station. In a prior-art system, the SRESb would be transmitted as such to the visitor location register VLR 3 in which it would be compared with the original number SRESa. If then SRESa and SRESb were equal, the mobile subscriber would be accepted.

In accordance with the invention, however, SRESb is altered in the SIM card using the first algorithm A1 such that the resulting SRES' contains information about the value in register ACM. The SRES' received in a base station or visitor location register is processed using the second algorithm A2, which corresponds to algorithm A1, producing the SRESb number and the ACM register value. After that, the SRESa and SRESb numbers can be compared and, correspondingly, the ACM register value can be compared to the previous value stored in the system. If the SRES numbers match and the ACM register value has increased from the previous value in accordance with the calls made from the mobile subscription, connection to the system can be accepted. If this is not the case, the mobile subscription is terminated.

In addition, FIG. 3 shows how a connection-specific chiphering key $K_c$ is generated on the basis of the RAND number and subscriber-specific authentication key $K_i$. This is done in both the authentication center and SIM card using algorithm A8. The result is further processed in the mobile station MS and base station using algorithm A5.

The SRES message cannot be understood by the user as its contents are generated in the SIM card. Having computed the contents of the SRES message the SIM card includes the ACM register value in the SRES message using the first algorithm. At its simplest the first algorithm may be an addition, multiplication or subtraction. Optionally, the message transmitted by the mobile station in connection with the authentication can be extended, so that the ACM register value can be added encrypted in the extension part of the message. The network is able to separate the SRES message and ACM register value by utilizing the second, corresponding, algorithm. The network advantageously stores the ACM register value and compares the new received ACM register value with the previous value in order to verify that the value is approximately correct.

It should be noted that the order in which algorithms A3 and A1 are executed could be the reverse of that mentioned above.

FIG. 4 illustrates in the form of simplified block diagram a mobile station 400 according to the invention and its connection with a cellular system. Below it is first described the conventional functions of the mobile station. The mobile station comprises an antenna 401 for receiving a radio-frequency (RF) signal transmitted by a base station. The RF signal received is directed through a duplex filter 402, for example, to a RF receiver 411 in which the signal is amplified and converted digital.

The signal is then detected and demodulated in block 412 as well as decoded in block 413. Then follows signal processing in accordance to whether the information transmitted is speech or data. Data may be stored as such in the mobile station's memory 404. Possible processed speech signal is directed to an earphone 434. In connection with the present invention, the authentication signals and chiphering key received from the base station are processed in a control unit 403 and SIM card 440. The control unit controls the above-mentioned reception blocks in accordance with a program stored in the control unit/memory.

Transmission from the mobile station is performed e.g. as follows. The control block 403 performs encoding according to the system for the audio signal coming from the microphone 435, block 421. The information transmitted may also be data, such as authentication, chiphering and right of use information according to the invention. Bursts are generated from the encoded data, block 422, which are modulated and amplified into a RF signal to be transmitted, block 423. The RF signal to be transmitted is led to the antenna 401 e.g. through a duplex filter 402. The processing and transmission functions described above are, too, controlled by the control unit 403. The authentication information according to the present invention is generated in the SIM card 440 and transmitted in the aforementioned transmitter chain in accordance with a program stored in the control unit. FIG. 4 also shows the keypad 431 and display 432 belonging to a conventional mobile station.

In order to realize the functions according to the invention, programs are stored in the control unit and in the memory of the SIM card according to which these control the other blocks of the mobile station in a manner according to the invention.

In addition, FIG. 4 shows parts of a mobile communication system that are used in a system according to the invention. Transmission and reception of a RF signal are realized through an antenna 450 in a base station 451. A communication link is set up between the base station 451 and switching center 453 via a base station controller 452. In addition to other base station systems in the system the switching center 453 is connected to a home location register 454, visitor location register 455 and public switched telephone network PSTN, for example. The home location register can store information concerning the rights of use of a mobile subscription according to the invention and the ACM value, among other things.

FIG. 5 shows a block diagram of a SIM card 540 according to the invention. A control unit 530 CPU controls the functions of the SIM card according to program code stored in the program memory 542 ROM. Various subscriber-specific information can be stored in the data memory 544 EEPROM which remains intact even when the operating voltage of the SIM card 540 is cut off. Such information may be e.g. the first algorithm used in the invention. The work memory 546 RAM can be used for temporary storage of information. A bus adapter 520 DATA-I/O adapts the SIM card's mobile station interface (control and data I/O) to the SIM card's internal bus 560. The SIM card additionally comprises an chiphering block 550 for chiphering and decrypting transmitted and stored information. Algorithms and programs relating to the present invention can be stored in the aforementioned memories, whereby the central processing unit 530 can be made to carry out the functions according to the invention. In addition, the purpose of the SIM card blocks is in accordance with the prior art to manage information needed in the identification of the subscription as well as to serve as a means for receiving and storing SMS messages, quick dial codes and other user-specific information.

Above the invention was described with reference to some of its preferred embodiments, but it is obvious that the invention can be modified in many ways without departing from the scope of the inventional idea defined by the claims attached hereto.

Especially it should be noted that although in the above description the invention was applied to a GSM system, the invention is applicable to other systems, too, which use an intelligent card to identify a subscription. Furthermore, it should be noted that the invention is not limited to the use of the signals, messages or algorithms mentioned above, but these can be chosen such that they are applicable to the system in question.

What is claimed is:

1. A mobile communications system (1–4) comprising means for controlling the quantitative right of use of a subscription and means for authenticating the mobile subscription by means of authentication signaling (7) between a subscriber identity module of a mobile station and the mobile communication system while the mobile station is being connected to the mobile communication system, characterized in that the system also comprises means (16) for storing information representing the remaining amount of the right to use and means (3, 4, 32) for receiving from the mobile station information representing the remaining amount of the right of use in connection with said authentication signaling; and further wherein the means for including information representing the spent and/or remaining amount of the right of use of a mobile subscription in said authentication message (SRES') comprises a memory (34) for storing a first algorithm, whereby said inclusion in the authentication message of the information is arranged so as to be carried out using the first algorithm.

2. A SIM card (6) to be connected to a mobile station, comprising means for processing mobile subscription authentication signals and means for generating an authentication message to be transferred from a mobile station (5) to a mobile communication system (1–4) while the mobile station is being connected to the mobile communication system, characterized in that said means for generating an authentication message further comprises means (16) at said mobile station for storing information representing the remaining amount of the right to use and means (31) for sending said information representing the amount of the right of use of a mobile subscription from said mobile station to said mobile communications system in said authentication message (SRES').

3. The SIM card of claim 2, characterized in that the means for storing information representing the spent and/or remaining amount of the right of use of a mobile subscription in said authentication message (SRES') comprises a memory (544) for storing a first algorithm, whereby said inclusion in the authentication message of the information is arranged so as to be carried out using the first algorithm.

4. A mobile station (5) comprising means for connecting a subscriber identity module to the mobile station and means for providing connection to a mobile communication system as well as means (401–423) for conveying mobile subscription authentication signals between the subscriber identity module (440) and mobile communication system while the mobile station is being connected to the mobile communication system, characterized in that said means for conveying further comprises means (16) at said mobile station for storing information representing the remaining amount of the right to use and means (403, 421–423) for conveying said information representing the amount of a right of use from the subscriber identity module (440) to the mobile communication system (450–455) in connection with said authentication signaling; and further wherein the means for including information representing the spent and/or remaining amount of the right of use of a mobile subscription in said authentication message (SRES') comprises a memory (34) for storing a first algorithm, whereby said inclusion in the authentication message of the information is arranged so as to be carried out using the first algorithm.

5. A method for controlling the right of use of a mobile subscription in a mobile communications system in which the mobile subscription is authenticated by means of authentication signaling between a mobile station and mobile communication system, characterized in that the information (ACM) representing the spent and/or remaining amount of the right of use is transferred (210) to the mobile communications system in connection with said authentication signaling (204–208) wherein, a message is transferred from the mobile station to the mobile communication system such that the information representing the spent and/or remaining amount of the right of use is altered using a first algorithm (208) and the altered information is included in the message transferred from the mobile station to the mobile communication system.

6. The method of claim 5, characterized in that from the message received by the communication system it is restored by means of a second algorithm the altered information representing the spent and/or remaining amount of the right of use.

7. The method of claim 5, characterized in that said first algorithm is stored in the SIM module of the mobile station by means of signaling from the network.

8. The method of claim 7, characterized in that the first algorithm is stored in the SIM module using the SMS (Short Message Service) message system associated with the SIM card.

9. A SIM card (6) to be connected to a mobile station, comprising means for processing mobile subscription authentication signals and for generating an authentication message to be transferred to a mobile station (5) and mobile communication system (1–4), characterized in that it comprises means (31, 33, 34) for including information representing the spent and/or remaining amount of the right of use of a mobile subscription in said authentication message (SRES'), wherein the means for including information representing the spent and/or remaining amount of the right of use of a mobile subscription in said authentication message (SRES') comprises a memory (34) for storing a first algorithm, whereby said inclusion in the authentication message of the information is arranged so as to be carried out using the first algorithm, and further comprising means for altering the first algorithm by means of an instruction transferred from the system.

10. The SIM card of claim 9, characterized in that said instruction transferred from the system is an SMS (Short Message Service) message addressed to the SIM card.

11. A mobile station (5), characterized in that it comprises a SIM card (6) according to claim 9.

* * * * *

UNITED STATES PATENT AND TRADEMARK OFFICE
CERTIFICATE OF CORRECTION

PATENT NO. : 6,804,517 B1
DATED : October 12, 2004
INVENTOR(S) : Laurila

It is certified that error appears in the above-identified patent and that said Letters Patent is hereby corrected as shown below:

Title page,
Item [54], Title, delete "MODULE" and insert -- MOBILE --, therefor.

Column 1,
Line 3, delete "COMMUNICATION" and insert -- COMMUNICATIONS --, therefor.

Signed and Sealed this

Twenty-second Day of March, 2005

JON W. DUDAS
*Director of the United States Patent and Trademark Office*